United States Patent
Bach et al.

(10) Patent No.: US 12,307,422 B2
(45) Date of Patent: *May 20, 2025

(54) HOT DESK BOOKING USING USER BADGE

(71) Applicant: Crestron Electronics, Inc., Rockleigh, NJ (US)

(72) Inventors: Robert Bach, Lakewood Ranch, FL (US); Mark Slivovsky, Rockleigh, NJ (US); Philip Kirkpatrick, Ridgewood, NJ (US)

(73) Assignee: Creston Electronics, Inc., Rockleigh, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/437,393

(22) Filed: Feb. 9, 2024

(65) Prior Publication Data

US 2024/0177117 A1  May 30, 2024

Related U.S. Application Data

(63) Continuation of application No. 17/498,010, filed on Oct. 11, 2021, now Pat. No. 11,941,585.

(Continued)

(51) Int. Cl.
  *G06Q 10/00* (2023.01)
  *G06K 7/10* (2006.01)
  (Continued)

(52) U.S. Cl.
  CPC ..... *G06Q 10/1093* (2013.01); *G06K 7/10297* (2013.01); *G06K 7/10366* (2013.01);
  (Continued)

(58) Field of Classification Search
  USPC ............ 709/206; 705/5, 7.12; 380/378, 277; 713/171
  See application file for complete search history.

(56) References Cited

U.S. PATENT DOCUMENTS 8,644,473 B1 * 2/2014 Bardwell .......... H04M 3/42263
                                                    379/212.01
9,204,291 B2  12/2015 Jackson et al.
(Continued)

FOREIGN PATENT DOCUMENTS

WO       2018/231828 A1    12/2018

OTHER PUBLICATIONS

"Sun, Mitel Team Up on UC Client, Hot-Desking", Mar. 17, 2008, https://www.eweek.com/networking/Sun-Mitel-Team-Up--on-UC-Client-Hot-Desking/.

(Continued)

*Primary Examiner* — Gurkanwaljit Singh
(74) *Attorney, Agent, or Firm* — Crestron Electronics, Inc.

(57) ABSTRACT

Badge data is read by a local workspace access system associated with a local workspace. An organization associated with the badge data is located, and the badge data is transmitted to the organization. A server associated with the organization receives the badge data, locates a member of the organization associated with the badge data, and transmits the workspace configuration associated with the member. A keyable code is transmitted to a messaging service device of the member, and the keyable code and the workspace configuration are transmitted to the local workspace access system. Member input of the keyable code is received by the local workspace access system which verifies that the inputted keyable code matches the keyable code received. In response to the verification, the workspace configuration is requested and received, the local workspace is configured based on the received workspace configuration and is activated for use by the member.

20 Claims, 7 Drawing Sheets

Related U.S. Application Data

(60) Provisional application No. 63/182,466, filed on Apr. 30, 2021, provisional application No. 63/174,379, filed on Apr. 13, 2021.

(51) Int. Cl.

| | | |
|---|---|---|
| *G06K 7/14* | (2006.01) | |
| *G06Q 10/02* | (2012.01) | |
| *G06Q 10/1093* | (2023.01) | |
| *H04L 9/40* | (2022.01) | |
| *H04W 4/12* | (2009.01) | |

(52) U.S. Cl.
CPC ........... *G06K 7/1417* (2013.01); *G06Q 10/02* (2013.01); *H04L 63/061* (2013.01); *H04W 4/12* (2013.01)

(56) References Cited

U.S. PATENT DOCUMENTS

| | | | |
|---|---|---|---|
| 9,380,682 B2 * | 6/2016 | Mead | G05B 19/042 |
| 9,602,172 B2 | 3/2017 | Jackson et al. | |
| 9,723,035 B1 | 8/2017 | Siddiqui | |
| 10,044,871 B2 | 8/2018 | Bargetzi et al. | |
| 10,178,737 B2 | 1/2019 | Mohan et al. | |
| 10,237,256 B1 * | 3/2019 | Pena | H04L 63/0853 |
| 10,505,751 B2 | 12/2019 | Casilli | |
| 10,798,233 B2 | 10/2020 | Sherburne | |
| 11,212,898 B2 * | 12/2021 | Mead | G05B 15/02 |
| 11,315,081 B2 | 4/2022 | Fujimura | |
| 11,558,914 B2 | 1/2023 | Alexander | |
| 11,574,255 B2 | 2/2023 | Gibson | |
| 2005/0091338 A1 * | 4/2005 | de la Huerga | G07C 9/28 |
| | | | 709/217 |
| 2011/0010218 A1 * | 1/2011 | Gupta | G06Q 10/1093 |
| | | | 705/7.18 |
| 2013/0209108 A1 | 8/2013 | Krishnakumar et al. | |
| 2014/0113589 A1 * | 4/2014 | Kurupacheril | H04M 1/2471 |
| | | | 455/411 |
| 2015/0359070 A1 * | 12/2015 | Mead | G05B 19/042 |
| | | | 315/154 |
| 2015/0371306 A1 * | 12/2015 | Besson | G06Q 30/02 |
| | | | 705/26.41 |
| 2017/0006162 A1 | 1/2017 | Bargetzi | |
| 2017/0208664 A1 * | 7/2017 | Mead | H05B 47/19 |
| 2018/0137369 A1 | 5/2018 | Roth et al. | |
| 2019/0236554 A1 | 8/2019 | Hill | |
| 2020/0010216 A1 * | 1/2020 | Devaux | B64F 1/00 |
| 2020/0104762 A1 | 4/2020 | Gibson et al. | |
| 2021/0144697 A1 | 5/2021 | Norota | |
| 2021/0329408 A1 | 10/2021 | Spahn | |
| 2022/0327438 A1 | 10/2022 | Bach | |
| 2022/0408269 A1 | 12/2022 | Termanini | |
| 2023/0049989 A1 | 2/2023 | Franc De Ferriere | |

OTHER PUBLICATIONS

"Notice of References Cited", PTO-892, U.S. Appl. No. 17/718,953, filed Feb. 23, 2024.

"Notice of References Cited", PTO-892, U.S. Appl. No. 17/734,692, filed Feb. 9, 2024.

"Office Scene is Heartbreak Hotel: New Desk Policies Get Workers Wandering." Crain's Detroit Business (1994): 8. ProQuest. Web. Nov. 1, 2024 (Year: 1994).

"Notice of References Cited", PTO-892, U.S. Appl. No. 17/718,953, filed Nov. 14, 2024.

* cited by examiner

HOT DESK BOOKING USING USER BADGE

CROSS-REFERENCE TO RELATED APPLICATIONS

This application is a continuation of U.S. patent application Ser. No. 17/498,010, filed Oct. 11, 2021, which claims the benefit of the filing date of U.S. Provisional Patent Application No. 63/174,379, filed Apr. 13, 2021, and U.S. Provisional Patent Application No. 63/182,466, filed Apr. 30, 2021, the disclosures of which are incorporated herein by reference.

BACKGROUND OF THE INVENTION

Technical Field

The present embodiments relate to workspace personalization and, more particularly, to a workspace personalization system in which a user's badge information is employed.

Background Art

In the corporate environment, there has been a growing trend to move to agile workspaces, open floor plans, and hoteling. These trends existed before the Covid-19 pandemic, but with the recent closure of many offices due to the pandemic, working from home became a standard practice that has continued, at least in part, even with the gradual reopening of many workplaces. Rather than return fulltime to the workplace, many employees now work in their offices for only part of the week or intermittently, reducing or eliminating the need for dedicated office space for each employee.

Corporations that, in 2019, were already cutting desk commitments by 10-20% to reduce real estate costs and to offset employee vacations and other absences have continued to pursue this trend. Building architects and interior designers are pushing open floor plan concepts in which non-traditional workspaces are intermingled with traditional seated desks, standing work areas, and bar height collaboration tables. As a result, traditional clustered departments offices have been turned into "neighborhoods" of flexible unassigned seating.

Space booking addresses many of the issues inherent in, for example, first-come first-serve desk availability by assuring the availability of desks or desk "neighborhoods". With space booking, the user has to log in remotely from home and select their workspace for a given day or range of days with availability of the workspace assured. The employee then checks in at the office to activate the workspace. Alternatively, the employee logs in using their personal mobile device, such as their cellphone, and then checks in at the office. Both of these options, typically require at least entry of a login and password to book the workspace and then configure the workspace.

It is therefore desirable to provide a system that provides a more convenient and straightforward check in process.

SUMMARY OF THE INVENTION

It is to be understood that both the general and detailed descriptions that follow are exemplary and explanatory only and are not restrictive.

DISCLOSURE OF INVENTION

In accordance with an aspect, a workspace personalization system, comprises: (a) a local workspace access system associated with a local workspace, and including: (1) a badge reader configured to read badge data from a badge, and (2) a communication interface configured to transmit the badge data over a network; (b) a workspace personalization management system, including: (1) data storage, (2) a communication interface configured to receive the badge data transmitted by the local workspace access system, and (3) a processor configured to locate, in the data storage, an organization associated with the received badge data, (4) the communication interface of the workspace personalization management system being further configured to transmit the received badge data to the associated organization; and (c) a server associated with the organization, and including: (1) data storage, (2) a communication interface configured to receive the badge data transmitted by the workspace personalization management system, and (3) a processor configured to locate, in the data storage, a member of the organization who is associated with the received badge data, a messaging service device associated with that member, and a workspace configuration associated with that member, and (4) the communication interface of the server being further configured to transmit, to the workspace personalization management system over the network, the workspace configuration associated with the member; (d) the workspace personalization management system further including: (1) a messaging service interface configured to transmit, in response to the communication interface of the workspace personalization management system receiving the workspace configuration associated with the member from the server, a keyable code over a messaging service network to the messaging service device of the member, (2) the communication interface of the workspace personalization management system being further configured to transmit, to the local workspace access system over the network, the keyable code and the workspace configuration associated with the member; (e) the local workspace access system further including: (1) a plurality of keys configured to receive member input of the keyable code, and (2) a processor configured to verify that the inputted keyable code matches the keyable code received from the workspace personalization management system, and in response to such verification, configure the local workspace based on the received workspace configuration, and activate the local workspace for use by the member.

According to a further aspect, a workspace personalization system, comprises: (a) a local workspace access system associated with a local workspace, and including: (1) a badge reader configured to read badge data from a badge, and (2) a communication interface configured to transmit the badge data over a network; (b) a workspace personalization management system, including: (1) data storage, (2) a communication interface configured to receive the badge data transmitted by the local workspace access system, and (3) a processor configured to locate, in the data storage, an organization associated with the received badge data, (4) the communication interface of the workspace personalization management system being further configured to transmit the received badge data to the associated organization; and (c) a server associated with the organization, and including: (1) data storage, (2) a communication interface configured to receive the badge data transmitted by the workspace personalization management system, and (3) a processor configured to locate, in the data storage, a member of the organization who is associated with the received badge data, a messaging service device associated with that member, and a workspace configuration associated with that member, and (4) the communication interface of the server being further configured to transmit, to the workspace personalization management system over the network, the workspace configuration associated with the member; (d) the workspace personalization management system further including: (1) a messaging service interface configured to transmit, in response to the communication interface of the workspace personalization management system receiving the workspace configuration associated with the member from the server, a keyable code over a messaging service network to the messaging service device of the member, (e) the local workspace access system further including: (1) a plurality of keys configured to receive member input of the keyable code, (2) the communication interface of the local workspace access system being further configured to transmit the member inputted keyable code to the workspace personalization management system; (f) wherein (1) the processor of the workspace personalization management system is further configured to verify that the inputted keyable code matches the keyable code transmitted to the messaging service device of the member, and (2) the communication interface of the workspace personalization management system is further configured to transmit, in response to the inputted keyable code being verified, the workspace configuration associated with the member to the local workspace access system over the network; (g) the local workspace access system further including: (2) a processor configured to set up the local workspace based on the received workspace configuration, and activate the local workspace for use by the member.

According to another aspect, a workspace personalization system, comprises: (a) a local workspace access system associated with a local workspace, and including: (1) a badge reader configured to read badge data from a badge, and (2) a communication interface configured to transmit the badge data over a network; (b) a workspace personalization management system, including: (1) data storage, (2) a communication interface configured to receive the badge data transmitted by the local workspace access system, and (3) a processor configured to locate, in the data storage, an organization associated with the received badge data, (4) the communication interface of the workspace personalization management system being further configured to transmit the received badge data to the associated organization; and (c) a server associated with the organization, and including: (1) data storage, (2) a communication interface configured to receive the badge data transmitted by the workspace personalization management system, (3) a processor configured to locate, in the data storage, a member of the organization who is associated with the received badge data, a messaging service device associated with that member, and a workspace configuration associated with that member, and (4) a messaging service interface configured to transmit a keyable code over a messaging service network to the messaging service device of the member, (5) the communication interface of the server being further configured to transmit, to the local workspace access system over the network, the keyable code and the workspace configuration associated with the member; (d) the local workspace access system further including: (1) a plurality of keys configured to receive member input of the keyable code, and (2) a processor configured to verify that the inputted keyable code matches the keyable code received from the server, and in response to such verification, configure the local workspace based on the received workspace configuration, and activate the local workspace for use by the member.

BRIEF DESCRIPTION OF DRAWINGS

The accompanying figures further illustrate the present embodiments.

The components in the drawings are not necessarily drawn to scale, emphasis instead being placed upon clearly illustrating the principles of the present embodiments. In the drawings, like reference numerals designate corresponding parts throughout the several views.

BRIEF DESCRIPTION OF THE SEVERAL VIEWS OF THE DRAWING

Figure 1:
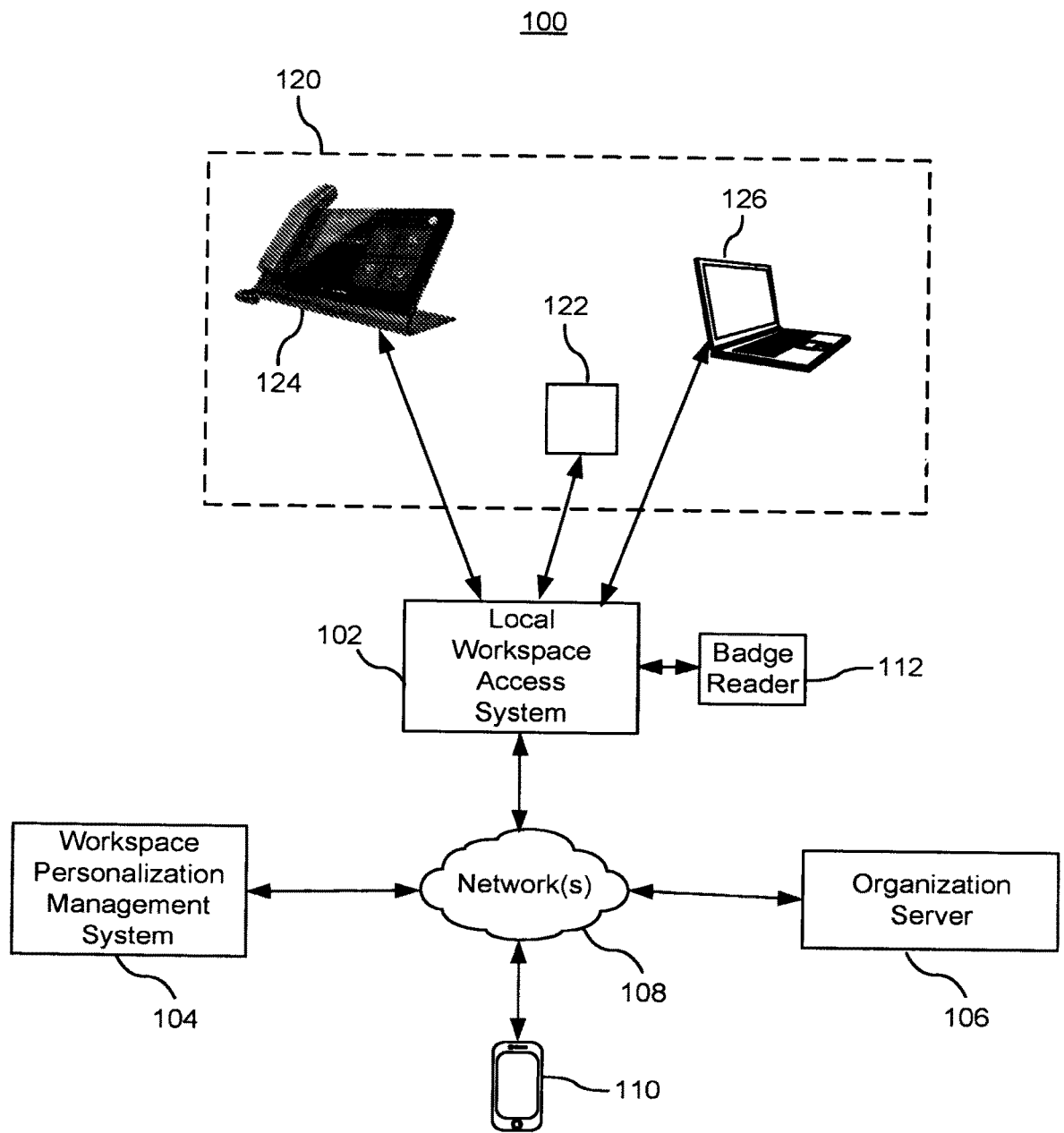

FIG. 1 is a schematic diagram showing an example of a workspace personalization system in accordance with an embodiment.

Figure 2A:
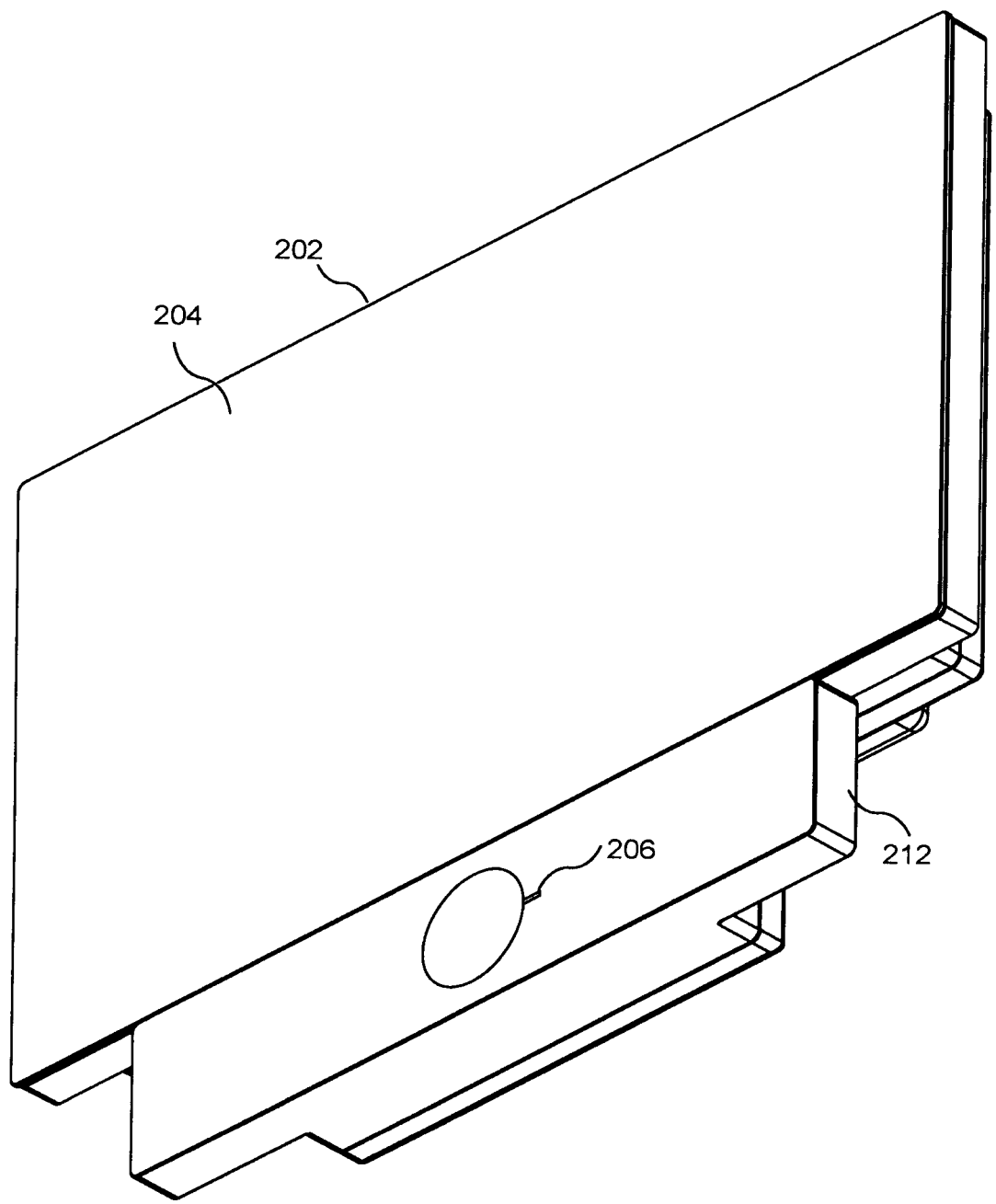

FIG. 2A depicts a local workspace access system and badge reader in accordance with an embodiment.

Figure 2B:
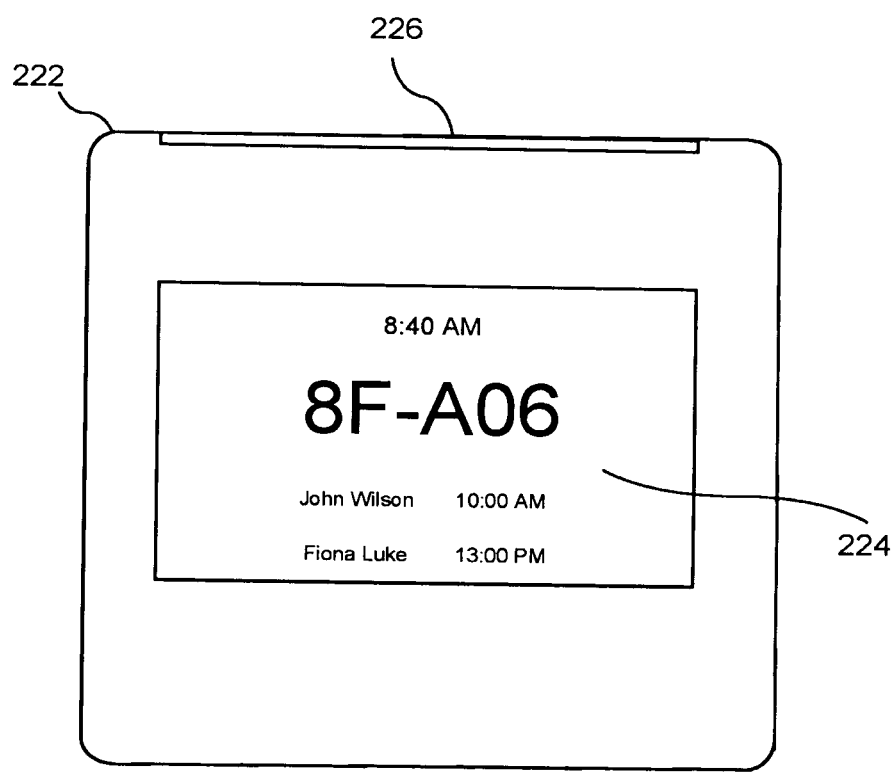

FIG. 2B depicts another local workspace access system and badge reader in accordance with an embodiment.

Figure 3:
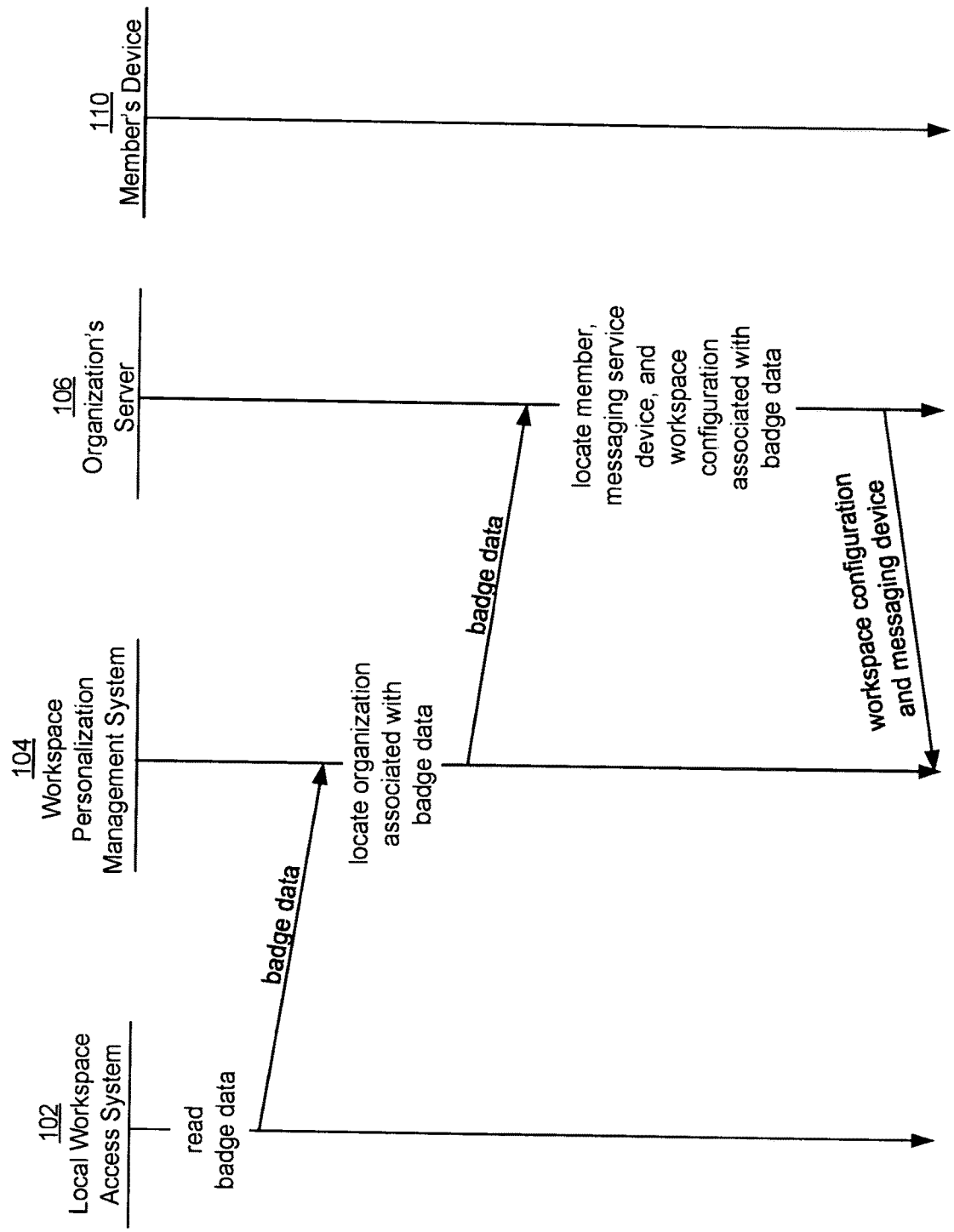

FIG. 3 illustrates a sequence of messages among components of the workspace personalization system in accordance with an embodiment.

Figure 4:
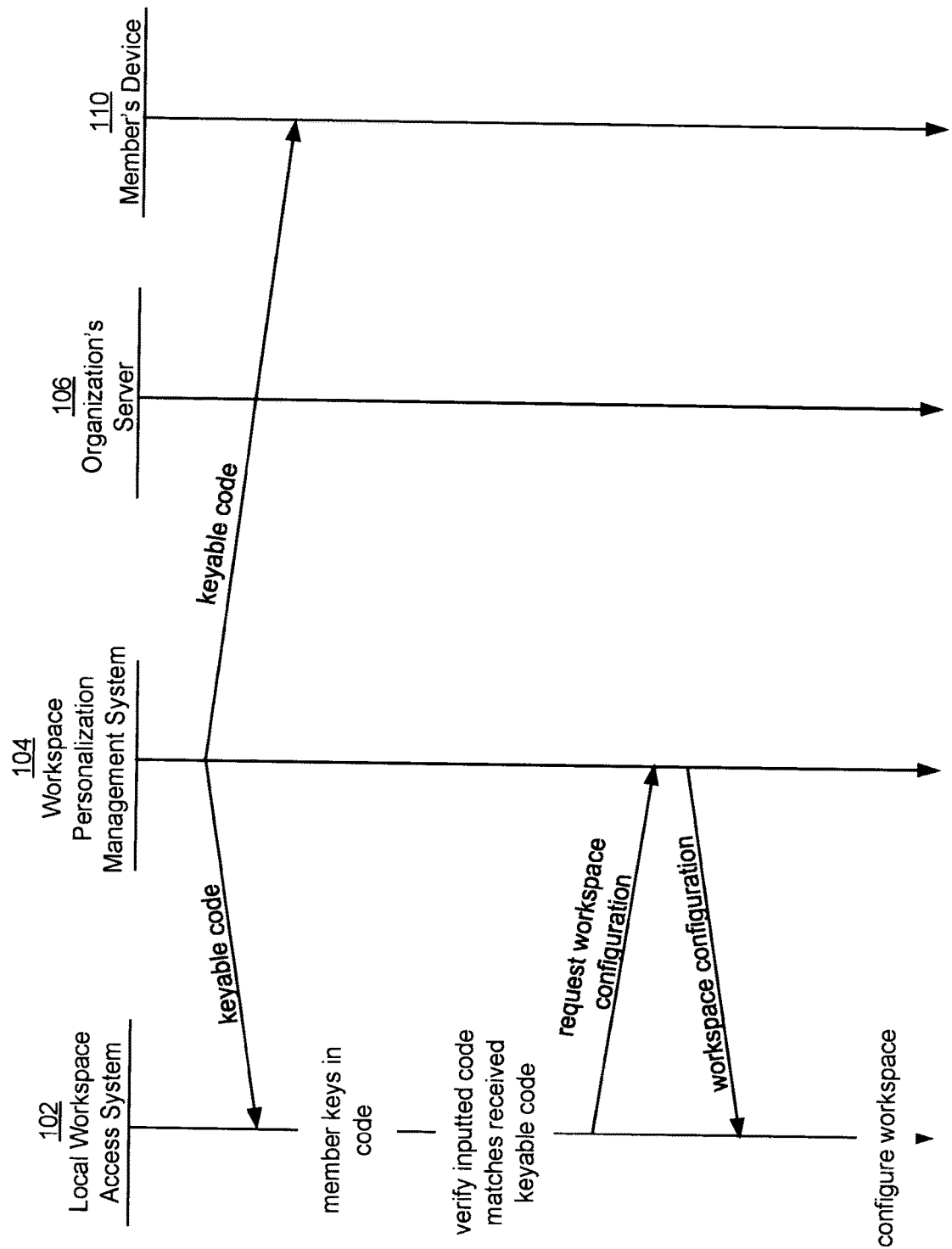

FIG. 4 illustrates a further sequence of messages among components of the workspace personalization system in accordance with embodiment.

Figure 5:
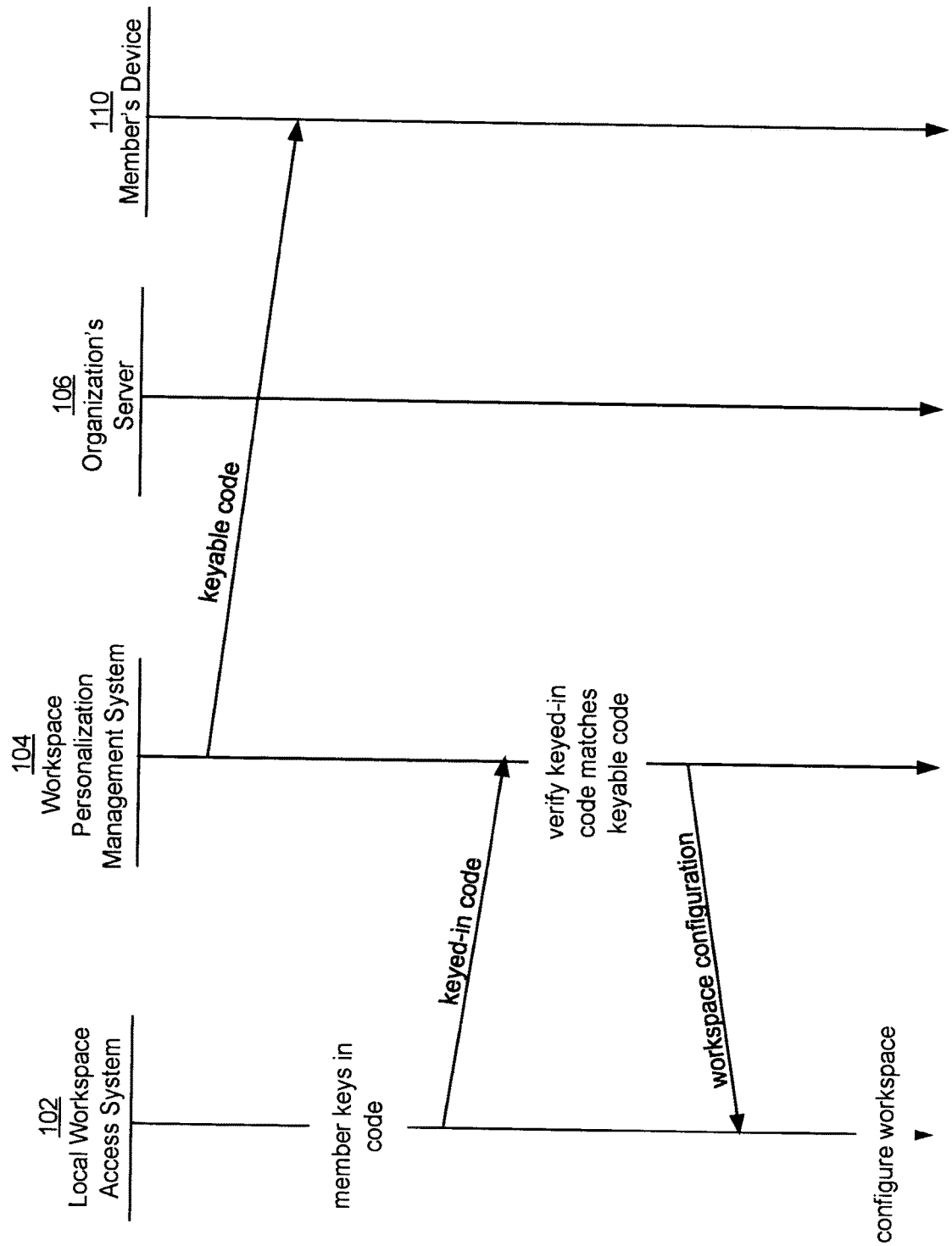

FIG. 5 illustrates an alternative further sequence of messages among components of the workspace personalization system in accordance with embodiment.

Figure 6:
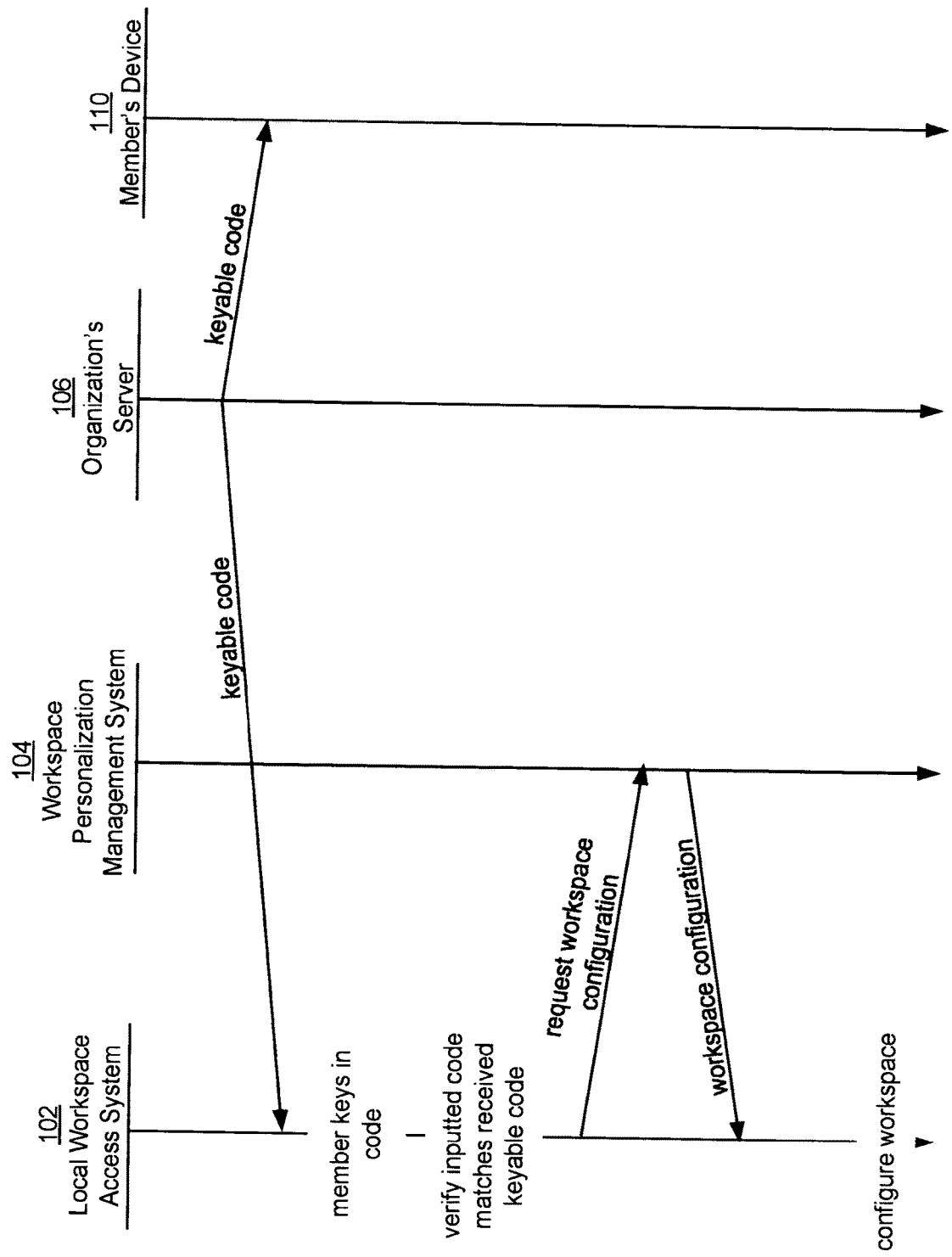

FIG. 6 illustrates another alternative further sequence of messages among components of the workspace personalization system in accordance with embodiment.

DETAILED DESCRIPTION OF THE INVENTION

The present embodiments provide a workspace personalization system, and more specifically to systems, methods, and modes for providing personalized hot-desking, but is not limited thereto. The embodiments of the workspace personalization system can be used in small, mid, or large-scale commercial spaces. While the embodiments are described herein as being implemented for commercial facilities, they are not limited to such an implementation. Products for other markets can be built upon the same framework with minimal modification. The present embodiments may be employed in other type of venues or facilities, including in residential, commercial spaces, retail, or nonprofit structures or venues. The system is further designed to be quickly deployable, allowing temporary installations for short-term to be feasible.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

LIST OF REFERENCE NUMBERS FOR THE MAJOR ELEMENTS IN THE DRAWING

The following is a list of the major elements in the drawings in numerical order.
   100 Workspace Personalization system
   102 Local Workspace Access System
   104 Workspace Personalization Management System
   106 Organization's Server
   108 Network(s)
   110 Member's Device
   112 Badge Reader
   120 Hot-Desking Station
   122 Workspace 124 Workspace Telephone
126 Personal Computer
202 Local Workspace Access System
204 Local Workspace Access System Display
206 Local Workspace Access System Indicator Light
212 Badge Reader
222 Local Workspace Access System and Badge Reader
224 Local Workspace Access System Display
226 Local Workspace Access System Indicator Light

MODE(S) FOR CARRYING OUT THE
INVENTION

The embodiment described herein in the context of workspace personalization, but is not limited thereto, except as may be set forth expressly in the appended claims.

Referring first to FIG. 1, a workspace personalization system 100 for implementing a personalized workspace environment is shown according to an embodiment. It should be noted that the exemplary embodiment of workspace personalization system 100 may be varied in one or more aspects without departing from the spirit and scope of the teachings disclosed herein.

Workspace personalization system 100 may include one or more of a local workspace access system 102, a workspace personalization management system 104, an organization server 106, a badge reader 112, and a workspace 120, some or all of which may be interconnected over one or more networks 108. The workspace personalization system 100 may also be connected over one or more networks 108 to a member's messaging service device 110. The hot-desking station 120 may include one or more of workspaces 122, workspace telephones 124, and a personal computer 126. The hot-desking station 120 may be one or more of various workspace configurations also known in the art as hot-desking spaces, other dedicated workspaces within an open space concept, cubicles, co-working spaces, semi-private offices, private offices, or the like.

The local workspace access system 102 may be a wall mounted, mullion mounted, or cubicle divider mounted device. Alternatively, the local workspace access system 102 may include a free-standing product adapted to be placed on a surface, such as a desk or other work surface. As a further alternative, the local workspace access system 102 may include a housing permanently or removably attached to a surface, such as, for example, using a desk mounting bracket or by being recessed into a cavity formed in the surface.

The local workspace access system 102 may include a processor, a memory, other storage, and a communication interface for communication with the workspace personalization management system 104 over the one or more communication networks 108. According to an embodiment, the local workspace access system 102 may include a plurality of keys for receiving input, such as in a physical keyboard or physical keypad or in a touchscreen with a graphical keyboard or graphical keypad.

According to an embodiment, the local workspace access system 102 may incorporate, or may be connected to a badge reader 112 for reading data stored in a badge, such as a physical badge or a software badge. When the badge is a physical badge, the badge may be a Radio-frequency identification (RFID) badge or other proximity communication badge or may be smart card or other near field communication (NFC) card. When the badge is a software badge, the badge may be a mobile credential stored in a smartphone or other mobile device or may be another software access control device.

The badge reader 112 may read data from the badge when, for example, the badge is brought next to or in proximity to the badge reader 112. Alternatively, the badge reader 112 may read data from the badge using a wireless communication protocol such as Bluetooth.

FIGS. 2A and 2B show other examples of a local workspace access systems, each according to an embodiment.

As FIG. 2A shows, the local workspace access system 202 may include a display screen 204 adapted to display data to the user. Display screen 204 may comprise an LCD screen, an LED screen, or other screen type known in the art. Display screen 204 may further comprise a touch screen capable of receiving user input, although adjacent buttons can also be utilized for user input. The local workspace access system 202 may be configured as a wall-mounted, mullion mounted, or desk mounted touchscreen device, such as one of the TS, TSS, TST, or TSW series touchscreens by Crestron® Electronics, Inc.

A badge reader 212 may be physically coupled to the local workspace access system 202 or may be disposed separately from the local workspace access system 202. The badge reader 212 may communicate with the local workspace access system 202 using a wired connection, such as using an Ethernet, or USB-family, or other known connections. Alternatively, the badge reader 212 may communicate with the local workspace access system 202 via a wireless connection, such as using WiFi, Bluetooth, NFC, or other wireless standards.

The badge reader 212 further includes a status bar 206 for status indication. The status bar 206 may comprise one or more light sources, such as LEDs, and a light diffuser for diffusing light. Alternatively, in place of or in conjunction with the status bar 206, the local workspace access system 202 may include one or more lightbars to provide status indication.

FIG. 2B shows an alternative local workspace access system 222 according to an embodiment. The local workspace access system 222 incorporates, and is integral with, the badge reader.

A display screen 224 is adapted to display data. The display screen 203 may include an LCD screen, an LED screen, or other screen type known in the art. The display screen 203 may further comprise a touch screen capable of receiving user input, although adjacent buttons can also be utilized for user input.

The local workspace access system 222 further includes a status bar 226 for status indication. The status bar 226 may include one or more light sources, such as LEDs, as well as a light diffuser for diffusing light.

The local workspace access system 222 may incorporate the hot-desking station described in U.S. Provisional Patent Application No. 63/182,466, the disclosure of which is incorporated herein by reference.

Referring back to FIG. 1, the workspace personalization management system 104 may include a dedicated computer architecture or may be distributed among multiple computing systems and architectures, or may be hosted by a cloud computing architecture or data center, as are known in the art, or may be some combination thereof.

The workspace personalization management system 104 may include one or more network interfaces to provide connectivity with the one or more networks 108 as well as with the local workspace access system 102, the organization server 106, and the member personal device 110 either using a direct wired or wireless connection or using the one or more networks 108.

The workspace personalization management system 104 may include one or more processing units configured for providing processing capability to execute an operating system, run various applications, and/or provide processing for one or more of the operations described herein. Workspace personalization management system 104 may further include one or more arrangements of memory or databases for storing data and may be co-located with the workspace personalization management system 104 or located remotely.

The workspace personalization management system 104 may comprise one or more software engines for providing the workspace personalization management discussed herein. Software engines may include a data structuring engine configured for structuring received data to establish various relationships, a data retrieval engine for interfacing with other sources of data, and/or an analytics engine configured for analyzing data.

The organization server 106 may be associated with one or more employers, professional organizations, or business organizations and stores information associated with its employees or members, including data stored in an employee's or member's ID badge. The organization server 106 may further store information and software needed to personalize a workspace for that employee or member. Such information and software may include the employee's or member's telephone or extension number, and information and software needed to configure the employee's or member's personal devices and connect them to services or files provided by the employer, professional organization, or business organization, including data protocols, client-server software, application programming interface (API) software, and graphical user interface (GUI) software and data.

The organization server 106 may be a dedicated, private server, employing standard security protocols. Alternatively, the functions of the organization server 106 may be distributed across multiple computing systems and architectures. As a further alternative, the organization server 106 can be further hosted via cloud computing or data center as is known in the art.

The organization server 106 may include one or more network interfaces to provide connectivity with the one or more networks 108 as well as with the local workspace access system 102, the workspace personalization management system 104, and the member personal device 110 either directly, using a direct wired or wireless connection, or using the one or more networks 108.

The organization server 106 may include one or more processing units configured for providing processing capability to execute an operating system, run various applications, and/or provide processing for one or more of the operations described herein. The organization server 106 may further include one or more arrangements of memory or databases for storing data. The memory or databases may be co-located with the organization server 106 or located remotely.

The organization server 106 may comprise one or more software engines for providing the workspace personalization management discussed herein. Software engines may include a data structuring engine configured for structuring received data to establish various relationships, a data retrieval engine for interfacing with other sources of data, and/or an analytics engine configured for analyzing data.

The one or more communication networks 108 may incorporate one or more of the Internet, a file transfer protocol (FTP) network, a wide area network (WAN), a local area network (LAN), a personal area network (PAN), a wireless network, a campus area network (CAN), a metropolitan area network (MAN), or the like. The one or more communication networks 108 may include a public switched telephone network (PSTN), a cable telephony network, an Internet Protocol (IP) telephony network, a wireless network, a hybrid Cable/PSTN network, a hybrid IP/PSTN network, a hybrid wireless/PSTN network, or any other suitable communication network or combination of communication networks. In addition, other network embodiments may be deployed with variations in the number and type of devices, communication networks, communication protocols, system topologies, and myriad other details without departing from the spirit and scope of the present embodiments. The one or more communication networks 108 may include one or more gateway devices to interface with the one or more communication networks 108, which may include software and/or hardware components to manage traffic entering and exiting the one or more communication networks 108 and conversion between the communication protocols used by various communication devices.

The member's messaging service device 110 may be any device by which a user can receive a keyable code from a messaging service over one of the one or more communication networks 108. The messaging service may include an SMS messaging service, an MMS messaging service or other text messaging service.

According to an embodiment, the member's messaging service device 110 may comprise a smartphone or a tablet device. Alternatively, the member's messaging service device 110 may comprise other portable electronic device known in the art such as a receiver, a portable computer such as a laptop, or any other computer configured for receiving SMS, MMS, or other text messages.

FIGS. 3-6 illustrates the actions and the messages exchanged within the systems of the workspace personalization system 100 according to an embodiment.

FIG. 3 illustrates the initial actions and the messages exchanged within the workspace personalization system 100 according to an embodiment. Initially, an employee or member of an organization initiates a hot desking request by bringing a badge, such as a RFID employee ID badge, in proximity to the badge reader 112 of the local workspace access system 102 or by communicating with the badge reader 112 in another manner or protocol using a physical or software badge. The badge reader 112 reads the store badge data, and then a communication interface within the local workspace access system 102 transmits the badge data to a communication interface within the workspace personalization management system 104.

A processor disposed within workspace personalization management system 104 then accesses memory or other data storage located within, or in communication with, the workspace personalization management system 104 to identify the organization associated with the received badge data, such as an employer or a professional organization. The communication interface of the workspace personalization management system 104 then transmits the badge data to a server associated with the identified employer or organization.

A communication interface disposed within the organization server 106 associated with the organization receives the badge data transmitted by workspace personalization management system 104. A processor disposed within the organization server 106 identifies, from memory or other data storage disposed within or in communication with the organization server 106, an employee or organization member who is associated with the received badge data, a messaging service device associated with that member, and a workspace configuration associated with that member. The communication interface of the organization server 106 then transmits, over one of the one or more networks 108 to the workspace personalization management system 104, the workspace configuration and the messaging service device that are associated with the employee or member.

FIG. 4 depicts an example of actions and exchanges of messages that may follow those set out in FIG. 3.

In response to the communication interface of the workspace personalization management system 104 receiving the workspace configuration and the messaging service device associated with the employee or member, a messaging service interface of the workspace personalization management system 104 transmits a keyable code over a messaging service network of the one or more networks, such as a text message, SMS message, or MMS message sent over a telephone network or data network, to the messaging service device 110 of the employee or member. The communication interface of the workspace personalization management system 104 further transmits the keyable code over another of the one or more networks 108 to the local workspace access system 102.

The employee or member then keys in the keyable code using the keyboard, keypad, or touchscreen associated with the local workspace access system 102. A processor contained within or connected to the local workspace access system 102 then compares the keyable code entered by the employee or member with the code received from the workspace personalization management system 104. When the two codes match, then the identity of the employee or organization member person is verified. The local workspace access system 102 then requests the employee's or member's workspace configuration from the workspace personalization management system 104 and receives such workspace configuration from the workspace personalization management system 104. The local workspace access system 102 next configures the local workspace 120 in accordance with the received workspace configuration, and thereafter activates the local workspace 120 for use by the employee or member.

FIG. 5 depicts an alternative example of actions and messages exchanged that may follow those shown in FIG. 3.

In this alternative, the workspace personalization management system 104 only transmits the keyable code to the messaging service device of the member 110. The member then keys in the keyable code using the keyboard, keypad, or touchscreen associated with the local workspace access system 102.

The communication interface of the local workspace access system 102 then transmits the member inputted keyable code to the workspace personalization management system 104. The processor of the workspace personalization management system 104 then compares the member inputted code keyed in by the member with the code sent to the members device 110. When the two codes match, then the identity of the employee or organization member person is verified, and the workspace personalization management system 104 transmits requests the employee's or member's workspace configuration to the local workspace access system 102. The local workspace access system 102 then configures the local workspace 120 in accordance with the transmitted workspace configuration, and thereafter activates the local workspace 120 for use by the employee or member.

FIG. 6 depicts a further alternative example of actions and messages exchanged that may follow those shown in FIG. 3.

In this alternative, it is a messaging service interface of the organization server 106 that transmits the keyable code over the messaging service network of the one or more communication networks 108 to the employee's or member's device member 110. The communication interface of the organization server 106 further transmits the keyable code over another of the one or more communication networks 108 to the local workspace access system 102.

Then, as described above regarding FIG. 4, the member then keys in the keyable code using the keyboard, keypad, or touchscreen associated with the local workspace access system 102. A processor contained within or connected to the local workspace access system 102 then compares the keyable code entered by the member with the code received from the workspace personalization management system 104. When the two codes match, then the identity of the employee or organization member person is verified. The local workspace access system 102 then requests the employee's or member's workspace configuration from the workspace personalization management system 104 and receives such workspace configuration from the workspace personalization management system 104. The local workspace access system 102 next configures the local workspace 120 in accordance with the received workspace configuration, and thereafter activates the local workspace 120 for use by the employee or member.

In this manner, the workspace personalization system 100, according to an embodiment, personalizes a hot desking or other temporary workspace for an employee or organization member in response to the employee or member merely "swiping" their ID badge in front of a badge reader and then keying in a code provided by text message or the like to the employee's or member's cellphone or other personal messaging device.

INDUSTRIAL APPLICABILITY

To solve the aforementioned problems, the present embodiments provide a workspace personalization system

ALTERNATE EMBODIMENTS

Alternate embodiments may be devised without departing from the spirit or the scope of the embodiments.

What is claimed is:

1. A workspace personalization system, comprising:
    (a) a local workspace access system associated with a local workspace, and configured to
        (1) read badge data from a badge using a badge reader associated with the local workspace access system, and
        (2) transmit the badge data;
    (b) a workspace personalization management system configured to
        (1) receive the badge data transmitted by the local workspace access system,
        (2) locate, in data storage associated with the workspace personalization management system, an organization associated with the received badge data, and
        (3) transmit the received badge data to the associated organization; and
    (c) a server associated with the organization and configured to
        (1) receive the badge data transmitted by the workspace personalization management system, (2) locate, in data storage associated with the server, a member of the organization who is associated with the received badge data, a messaging service device associated with that member, and a workspace configuration associated with that member, and (3) transmit the workspace configuration to the workspace personalization management system;

(d) the workspace personalization management system being further configured to (1) transmit, in response to the workspace personalization management system receiving the workspace configuration associated with the member from the server, a keyable code over a messaging service network to the messaging service device of the member, and (2) transmit the keyable code to the local workspace access system;

(e) the local workspace access system being further configured to (1) receive member input of the keyable code that was transmitted over the messaging service network to the messaging service device of the member, the member input being inputted using a plurality of keys associated with the local workspace access system, (2) verify that the member input matches the keyable code that was received from the workspace personalization management system, and (3) in response to such verification, (A) request, from the workspace personalization management system, the workspace configuration associated with the member, (B) receive the workspace configuration from the workspace personalization management system, (C) configure the local workspace based on the received workspace configuration, and (D) activate the local workspace for use by the member.

2. The workspace personalization system of claim 1, wherein (a) at least one of (i) the local workspace access system, (ii) the workspace personalization management system, or (iii) the server associated with the organization is configured to transmit over a network, and (b) the network includes at least one of the Internet, a file transfer protocol a (FTP) network, a wide area network (WAN), a local area network (LAN), a personal area network (PAN), a wireless network, a campus area network (CAN), a metropolitan area network (MAN), a public switched telephone network (PSTN), a cable telephony network, an Internet Protocol (IP) telephony network, a wireless network, a hybrid Cable/PSTN network, a hybrid IP/PSTN network, or a hybrid wireless/PSTN network.

3. The workspace personalization system of claim 1, wherein (a) the badge includes at least one of:

(1) a physical badge, wherein communication with the badge is carried out using at least one of Radio-frequency identification (RFID), other proximity communication, or near field communication (NFC); or (2) a software badge using at least one of a mobile credential or other software access control.

4. The workspace personalization system of claim 1, wherein (a) the messaging service includes at least one of a text messaging service, an SMS messaging service, or an MMS messaging service.

5. The workspace personalization system of claim 1, wherein (a) the plurality of keys includes at least one of a physical keypad, a physical keyboard, a graphical keypad, or a graphical keyboard.

6. The workspace personalization system of claim 1, wherein (a) the local workspace includes at least one of a desk, an office, a conference room, or a flexible workspace provider workspace.

7. The workspace personalization system of claim 1, wherein (a) the workspace configuration includes at least one of a member configuration of a personal computer, a member configuration of a desk phone, or member access to one or more peripheral devices.

8. A workspace personalization system, comprising:

(a) a local workspace access system associated with a local workspace, and configured to (1) read badge data from a badge using a badge reader associated with the local workspace access system, and (2) transmit the badge data;

(b) a workspace personalization management system configured to (1) receive the badge data transmitted by the local workspace access system, (2) locate, in data storage associated with the workspace personalization management system, an organization associated with the received badge data, and (3) transmit the received badge data to the associated organization; and (c) a server associated with the organization and configured to (1) receive the badge data transmitted by the workspace personalization management system, (2) locate, in data storage associated with the server, a member of the organization who is associated with the received badge data, a messaging service device associated with that member, and a workspace configuration associated with that member, and (3) transmit the workspace configuration to the workspace personalization management system;

(d) the workspace personalization management system being further configured to (1) transmit, in response to the workspace personalization management system receiving the workspace configuration associated with the member, a keyable code over a messaging service network to the messaging service device of the member;

(e) the local workspace access system being further configured to (1) receive member input of the keyable code that was transmitted over the messaging service network to the messaging service device of the member, the member input being inputted using a plurality of keys associated with the local workspace access system, and (2) transmit the member input to the workspace personalization management system;

(f) the workspace personalization management system being further configured to (1) verify that the member input matches the keyable code that the workspace personalization management system had transmitted to the messaging service device of the member, and
(2) transmit, in response to the member input being verified, the workspace configuration associated with the member to the local workspace access system;

(g) the local workspace access system being further configured to
(1) receive the workspace configuration from the workspace personalization management system,
(2) configure the local workspace based on the received workspace configuration, and
(3) activate the local workspace for use by the member.

9. The workspace personalization system of claim 8, wherein
(a) at least one of (i) the local workspace access system, (ii) the workspace personalization management system, or (iii) the server associated with the organization is configured to transmit over a network, and
(b) the network includes at least one of the Internet, a file transfer protocol a (FTP) network, a wide area network (WAN), a local area network (LAN), a personal area network (PAN), a wireless network, a campus area network (CAN), a metropolitan area network (MAN), a public switched telephone network (PSTN), a cable telephony network, an Internet Protocol (IP) telephony network, a wireless network, a hybrid Cable/PSTN network, a hybrid IP/PSTN network, or a hybrid wireless/PSTN network.

10. The workspace personalization system of claim 8, wherein
(a) the badge includes at least one of:
(1) a physical badge, wherein communication with the badge is carried out using at least one of Radio-frequency identification (RFID), other proximity communication, or near field communication (NFC); or
(2) a software badge using at least one of a mobile credential or other software access control.

11. The workspace personalization system of claim 8, wherein
(a) the messaging service includes at least one of a text messaging service, an SMS messaging service, or an MMS messaging service.

12. The workspace personalization system of claim 8, wherein
(a) the plurality of keys includes at least one of a physical keypad, a physical keyboard, a graphical keypad, or a graphical keyboard.

13. The workspace personalization system of claim 8, wherein
(a) the local workspace includes at least one of a desk, an office, a conference room, or a flexible workspace provider workspace.

14. The workspace personalization system of claim 8, wherein
(a) the workspace configuration includes at least one of a member configuration of a personal computer, a member configuration of a desk phone, or member access to one or more peripheral devices.

15. A workspace personalization system, comprising:
(a) a local workspace access system associated with a local workspace, and configured to
(1) read badge data from a badge using a badge reader associated with the local workspace access system, and
(2) transmit the badge data;

(b) a workspace personalization management system configured to
(1) receive the badge data transmitted by the local workspace access system,
(2) locate, in data storage associated with the workspace personalization management system, an organization associated with the received badge data, and
(3) transmit the received badge data to the associated organization; and (c) a server associated with the organization and configured to
(1) receive the badge data transmitted by the workspace personalization management system,
(2) locate, in data storage associated with the server, a member of the organization who is associated with the received badge data, a messaging service device associated with that member, and a workspace configuration associated with that member,
(3) transmit the workspace configuration to the workspace personalization management system;
(4) transmit a keyable code over a messaging service network to the messaging service device of the member, and
(5) transmit the keyable code to the local workspace access system;

(d) the local workspace access system being further configured to
(1) receive member input of the keyable code that was transmitted over the messaging service network to the messaging service device of the member, the member input being inputted using a plurality of keys associated with the local workspace access system,
(2) verify that the member input matches the keyable code that was received from the server, and
(3) in response to such verification,
(A) request, from the workspace personalization management system, the workspace configuration associated with the member,
(B) receive the workspace configuration from the workspace personalization management system,
(C) configure the local workspace based on the received workspace configuration, and
(D) activate the local workspace for use by the member.

16. The workspace personalization system of claim 15, wherein
(a) at least one of (i) the local workspace access system, (ii) the workspace personalization management system, or (iii) the server associated with the organization is configured to transmit over a network, and
(b) the network includes at least one of the Internet, a file transfer protocol a (FTP) network, a wide area network (WAN), a local area network (LAN), a personal area network (PAN), a wireless network, a campus area network (CAN), a metropolitan area network (MAN), a public switched telephone network (PSTN), a cable telephony network, an Internet Protocol (IP) telephony network, a wireless network, a hybrid Cable/PSTN network, a hybrid IP/PSTN network, or a hybrid wireless/PSTN network.

17. The workspace personalization system of claim 15, wherein
(a) the badge includes at least one of:
(1) a physical badge, wherein communication with the badge is carried out using at least one of Radio-frequency identification (RFID), other proximity communication, or near field communication (NFC); or (2) a software badge using at least one of a mobile credential or other software access control.

18. The workspace personalization system of claim 15, wherein
    (a) the messaging service includes at least one of a text messaging service, an SMS messaging service, or an MMS messaging service.

19. The workspace personalization system of claim 15, wherein
    (a) the plurality of keys includes at least one of a physical keypad, a physical keyboard, a graphical keypad, or a graphical keyboard.

20. The workspace personalization system of claim 15, wherein
    (a) the workspace configuration includes at least one of a member configuration of a personal computer, a member configuration of a desk phone, or member access to one or more peripheral devices.

\* \* \* \* \*